United States Patent
Kuo

(10) Patent No.: US 6,957,720 B2
(45) Date of Patent: Oct. 25, 2005

(54) SELF-LUBRICATION CABLE ASSEMBLIES

(76) Inventor: Yung-Pin Kuo, No. 55, Alley 121, Lane 175, Kuo Shen Rd., Chang Hwa City (TW)

( * ) Notice: Subject to any disclaimer, the term of this patent is extended or adjusted under 35 U.S.C. 154(b) by 193 days.

(21) Appl. No.: 10/374,977

(22) Filed: Feb. 28, 2003

(65) Prior Publication Data

US 2004/0168857 A1 Sep. 2, 2004

(51) Int. Cl.[7] ................................................. F16N 7/00
(52) U.S. Cl. ........................ 184/15.1; 184/94; 184/102
(58) Field of Search .......................... 184/15.1, 16, 94, 184/102; 74/500.5, 502.4, 502.6; 285/94, 284.1

(56) References Cited

U.S. PATENT DOCUMENTS

| | | | | |
|---|---|---|---|---|
| 401,988 A | * | 4/1889 | Wheat | 184/94 |
| 2,260,500 A | * | 10/1941 | Wylie | 285/238 |
| 2,712,862 A | * | 7/1955 | Pemberton | 188/205 R |
| 3,828,890 A | * | 8/1974 | Schott et al. | 184/15.1 |
| 4,046,225 A | * | 9/1977 | Shenk | 184/15.1 |
| 4,234,755 A | * | 11/1980 | Simons | 174/19 |
| 4,671,385 A | * | 6/1987 | Travis | 184/15.1 |
| 4,749,059 A | * | 6/1988 | Jonnes et al. | 184/15.1 |
| 4,892,005 A | * | 1/1990 | Nagano | 74/502.4 |
| 5,662,189 A | * | 9/1997 | Anderson et al. | 184/15.2 |
| 6,763,914 B2 | * | 7/2004 | Kuo | 184/15.1 |
| 2003/0146054 A1 | * | 8/2003 | Kuo | 184/15.1 |

* cited by examiner

Primary Examiner—Chong H. Kim
(74) Attorney, Agent, or Firm—Rosenberg, Klein & Lee

(57) ABSTRACT

A self-lubrication cable assembly includes a cable with a sheath mounted thereto and an end cap is connected to an end of the sheath. The end cap has a chamber defined therein and a plurality of lubrication rings are received in the chamber and mounted to the cable which extends through the end cap. A hole is defined radially through a wall of the end cap and communicates with the chamber. A protection sleeve is movably mounted to the end cap and covers the hole.

2 Claims, 10 Drawing Sheets

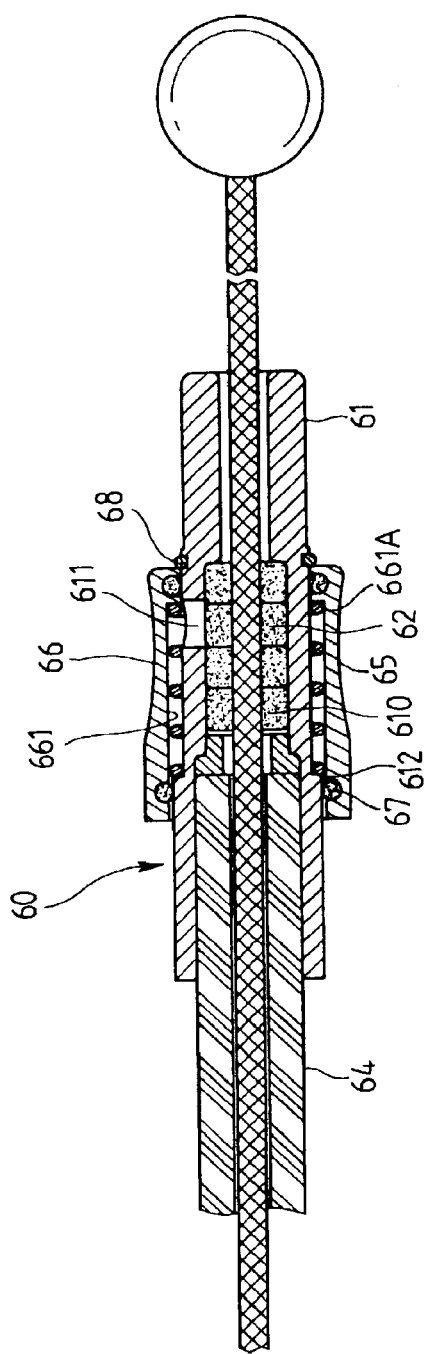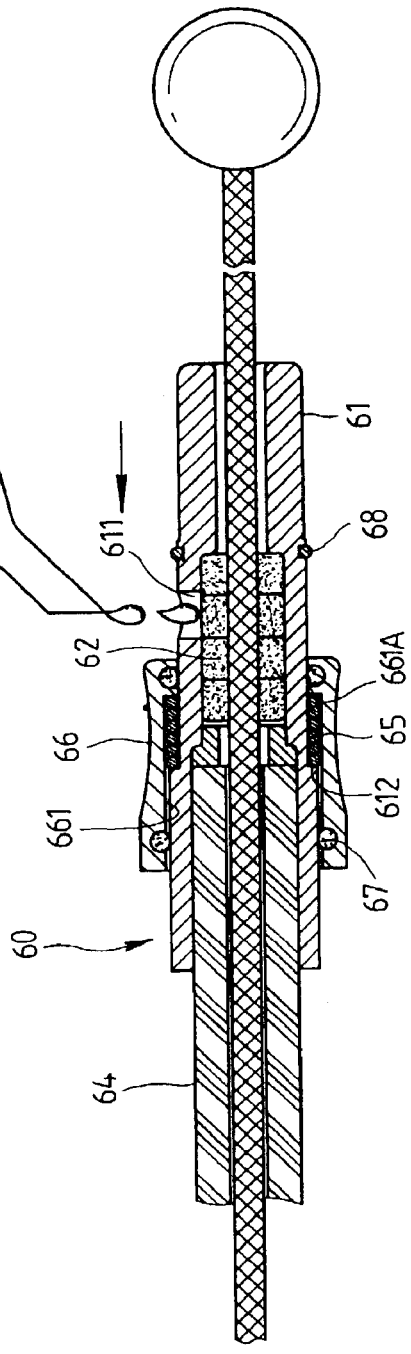

SELF-LUBRICATION CABLE ASSEMBLIES

FIELD OF THE INVENTION

The present invention relates to a self-lubrication brake cable assembly which has a hole for feeding lubricant defined in an end cap mounted connected to at an end of a plastic sheath and a protection sleeve removably covers the hole.

BACKGROUND OF THE INVENTION

A conventional brake cable assembly for bicycles is shown in FIG. 1 and generally includes a plastic sheath 20 mounted to an outside of the cable 10 and a metal end cap 30 is fixedly connected to an end of the sheath 20. The metal end cap 30 is inserted into a recess of a brake frame 40 and the cable 10 extends to the brake frame 40 so that when pulling the brake lever, the cable 10 is pulled so as to activate a brake system operationally connected to the other end of the cable 10. The frequent movement of the cable 10 in the plastic sheath 20 and the metal end cap 30 causes heat and friction and the lubricant on the cable 10 is quickly used out. This makes the movement of the cable 10 to be dull and the cable 10 gets rust easily.

The present invention intends to provide a self-lubrication cable that has a hole defined in the end cap and a plurality of lubrication rings are mounted to the cable so that the lubricant can be provided to the lubrication rings via the hole.

SUMMARY OF THE INVENTION

In accordance with one aspect of the present invention, there is provided a self-lubrication cable assembly which comprises a cable with a sheath mounted thereto and an end cap is connected to an end of the sheath. The end cap has a passage defined therethrough so that the cable extends through the passage. A chamber is defined in the end cap and shares a common axis with the passage. A plurality of lubrication rings are received in the chamber and mounted to the cable. A hole is defined radially through a wall of the end cap and communicates with the chamber. A protection sleeve is movably mounted to the end cap and covers the hole.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 4 is a cross sectional view to show the self-lubrication cable assembly of the present invention;

FIG. 5 shows the protection sleeve is pulled and lubricant is provided via the hole in the end cap;

DETAILED DESCRIPTION OF THE PREFERRED EMBODIMENT

Figure 1:
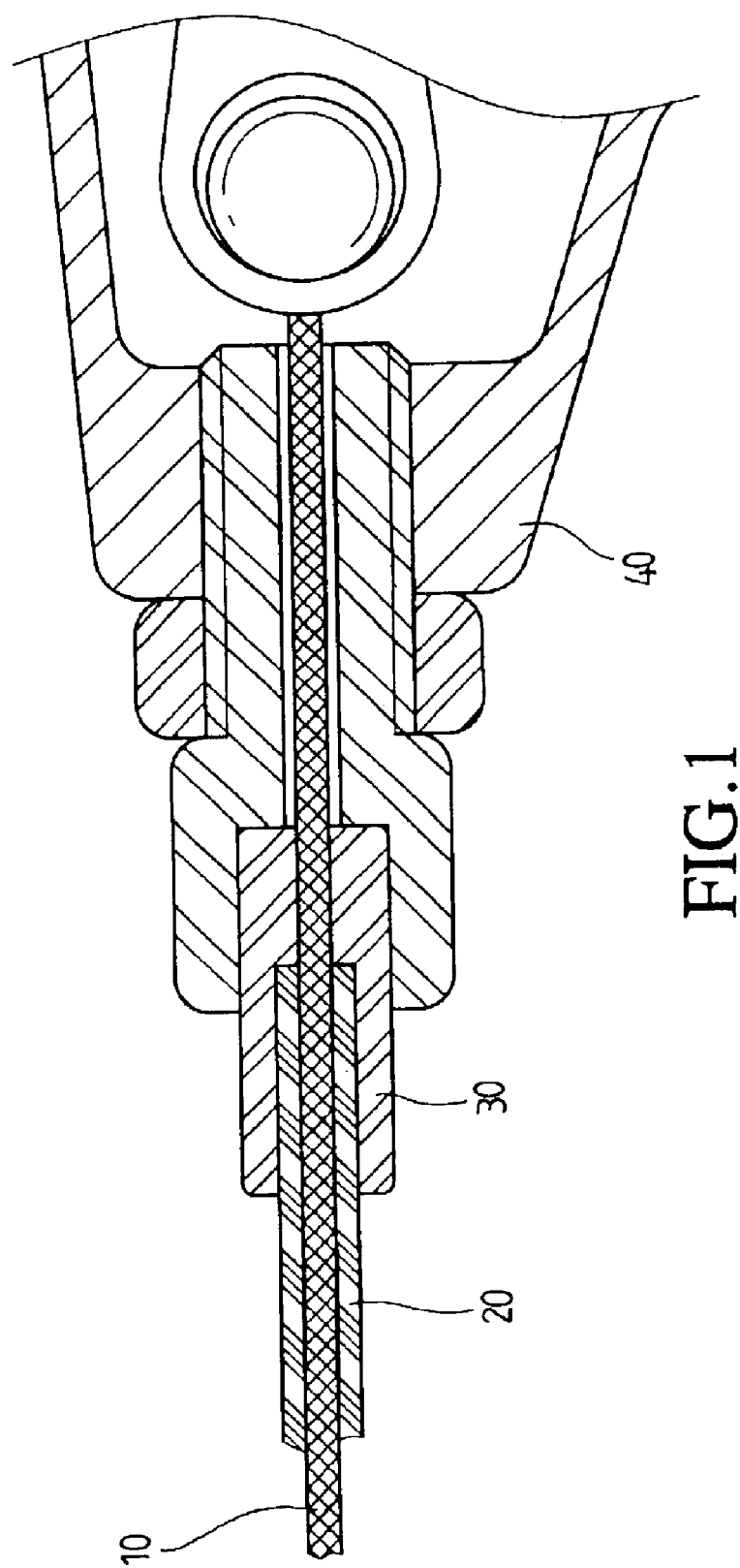
FIG. 1 is a cross sectional view to show a conventional cable assembly.
Figure 2:
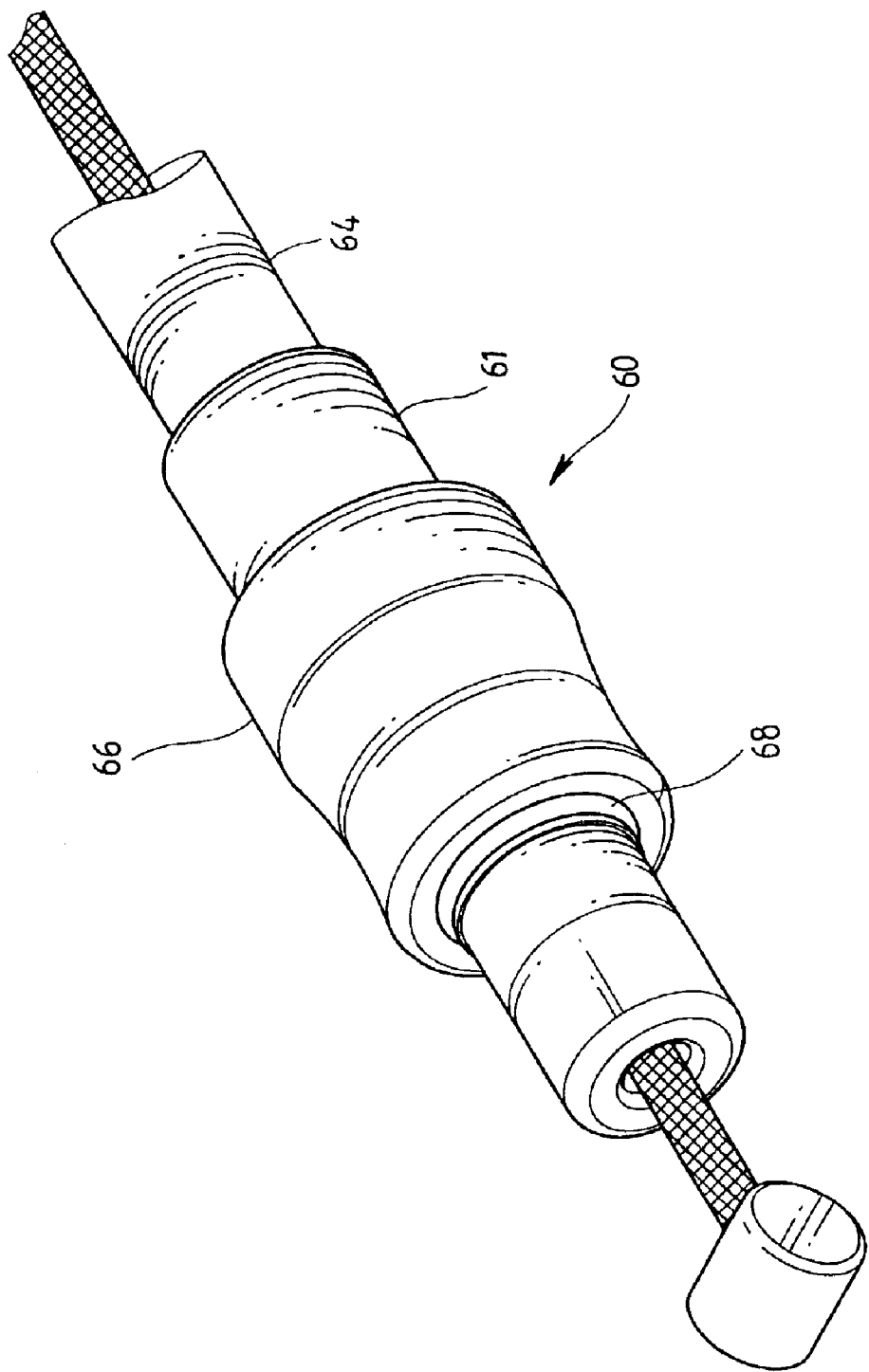
FIG. 2 is a perspective view to show the self-lubrication cable assembly of the present invention.
Figure 3:
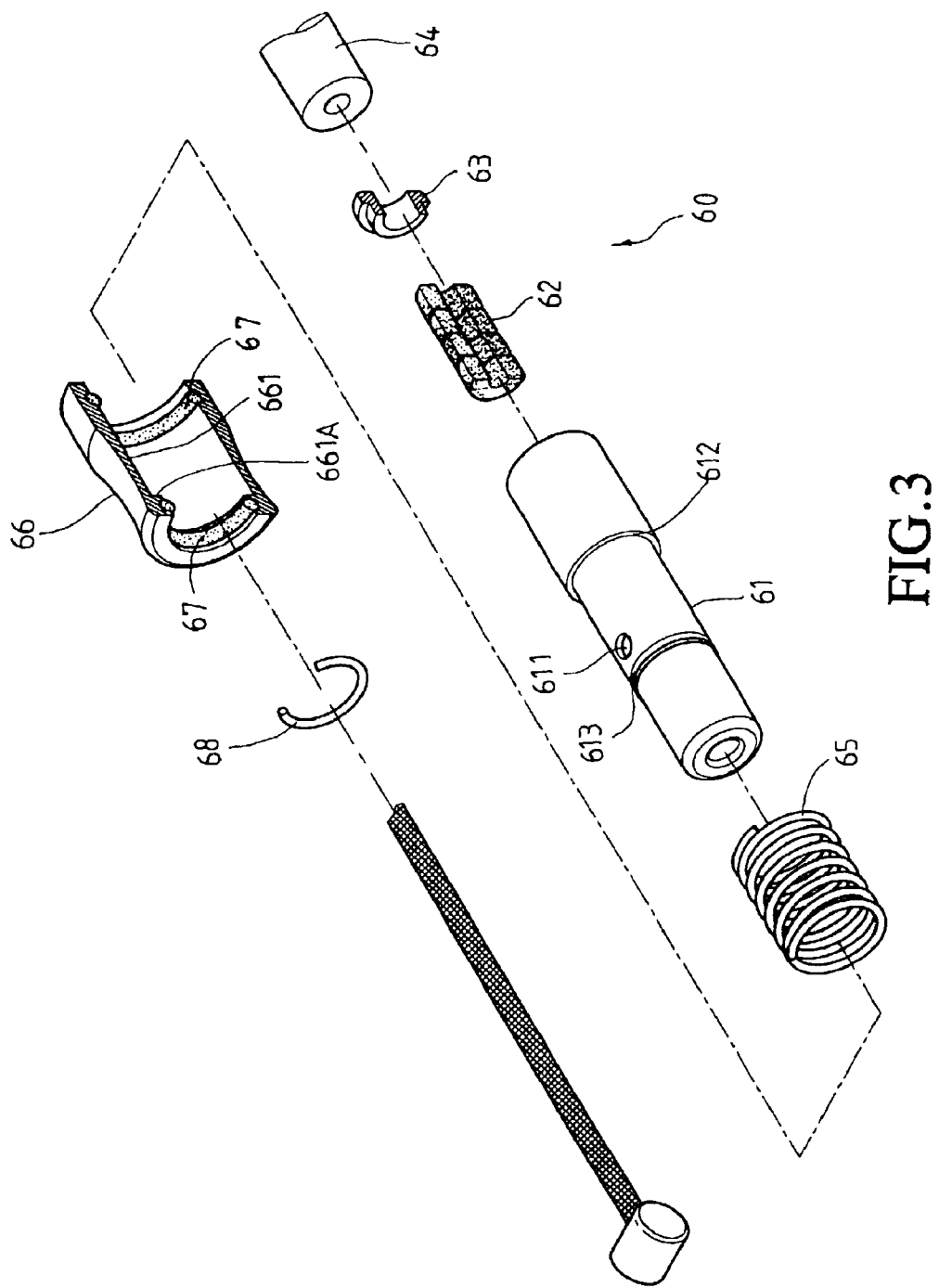
FIG. 3 is an exploded view to show the self-lubrication cable assembly of the present invention.
Figure 6:
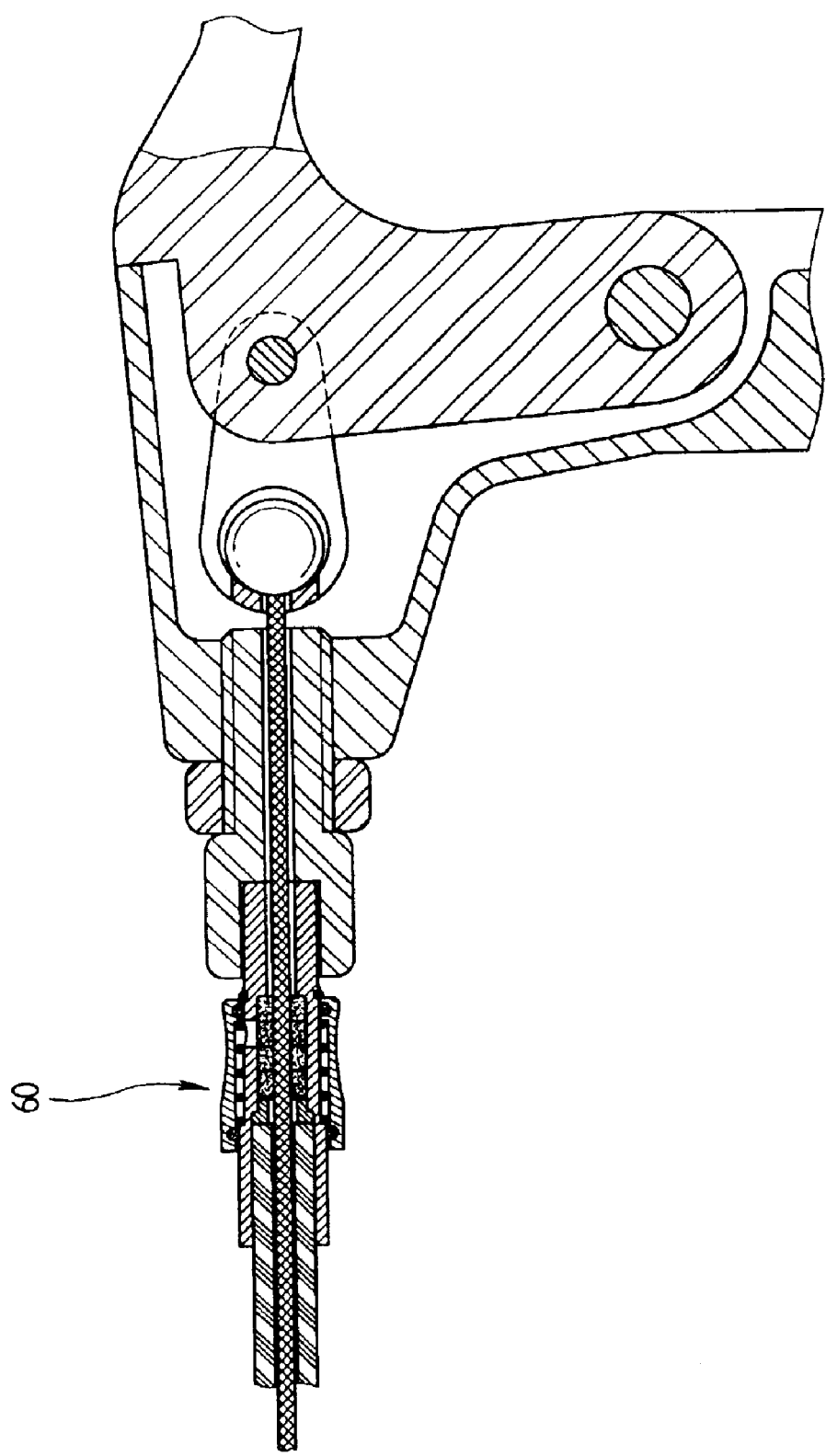
FIG. 6 shows the brake cable assembly is connected to a brake frame.

Referring to FIGS. 2, 3, 4, 6 and 8, the self-lubrication cable assembly 60 of the present invention comprises a cable with a sheath 64 mounted thereto and an end cap 61 is connected to an end of the sheath 64. The end cap 61 has a passage defined therethrough and the cable extends through the passage. A chamber 610 is defined in the end cap 61 and shares a common axis with the passage. A plurality of lubrication rings 62 are received in the chamber 610 and mounted to the cable. A positioning member 63 is received in the chamber 610 and urges the lubrication rings 62 which are then positioned by the positioning member 63. A hole 611 is defined radially through a wall of the end cap 61 and communicates with the chamber 610. A first shoulder 612 extends outward from an outer periphery of the end cap 61 and a spring 65 is mounted to the end cap 61. An end of the spring 65 contacting the first shoulder 612. A groove 613 is defined in an outer periphery of the end cap 61 so as to engaged with a C-shaped clamp 68.

A protection sleeve 66 is movably mounted to the end cap 61 and covers the hole 611. The protection sleeve 66 has a second shoulder 661A extending from an inner periphery thereof and the other end of the spring 65 contacts the second shoulder 661A. Two seal rings 67 are engaged with the inner periphery of the protection sleeve 66 and located close to two ends of the protection sleeve 66.

Figure 7:
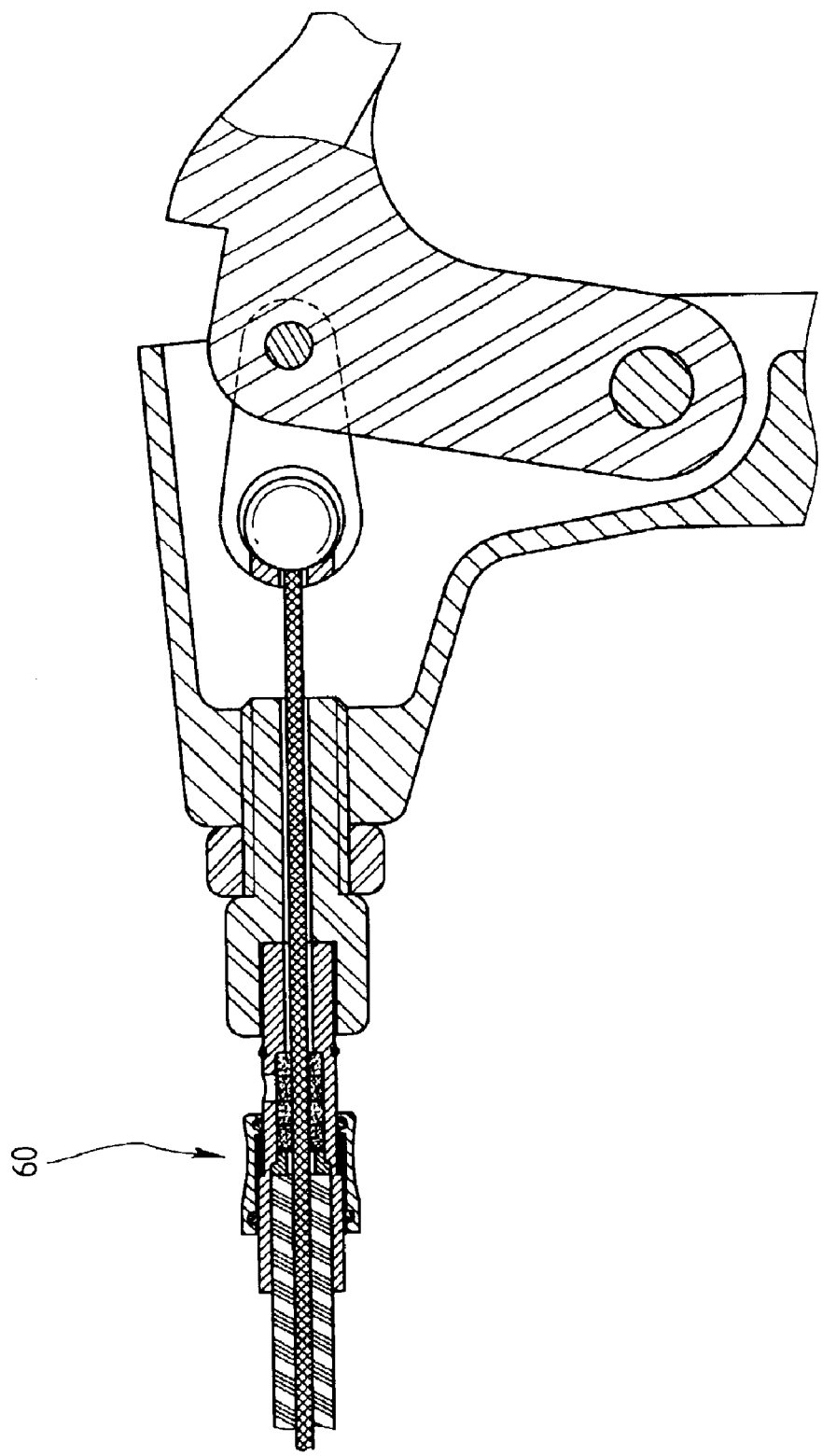
FIG. 7 shows the protection sleeve as shown in FIG. 6 is pulled.
Figure 8:
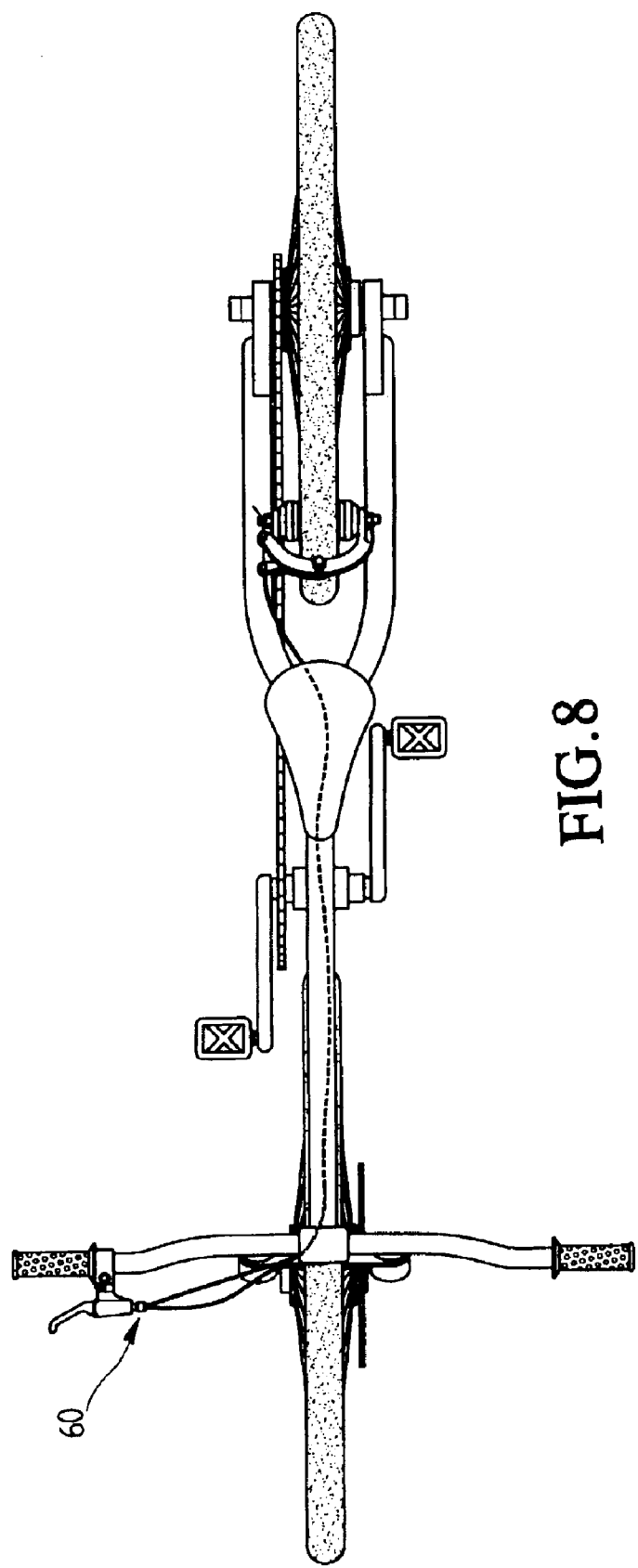
FIG. 8 is a top view to show the self-lubrication cable assembly of the present invention is connected to a bicycle.

Referring to FIGS. 5 and 7, the protection sleeve 66 can be pulled to compress the spring 65 and lubricant or oil can be entered into the chamber 610 and absorbed by the lubrication rings 62 via the hole 611. The protection sleeve 66 is then released and can be stopped by the C-shaped clamp 68.

Figure 9:
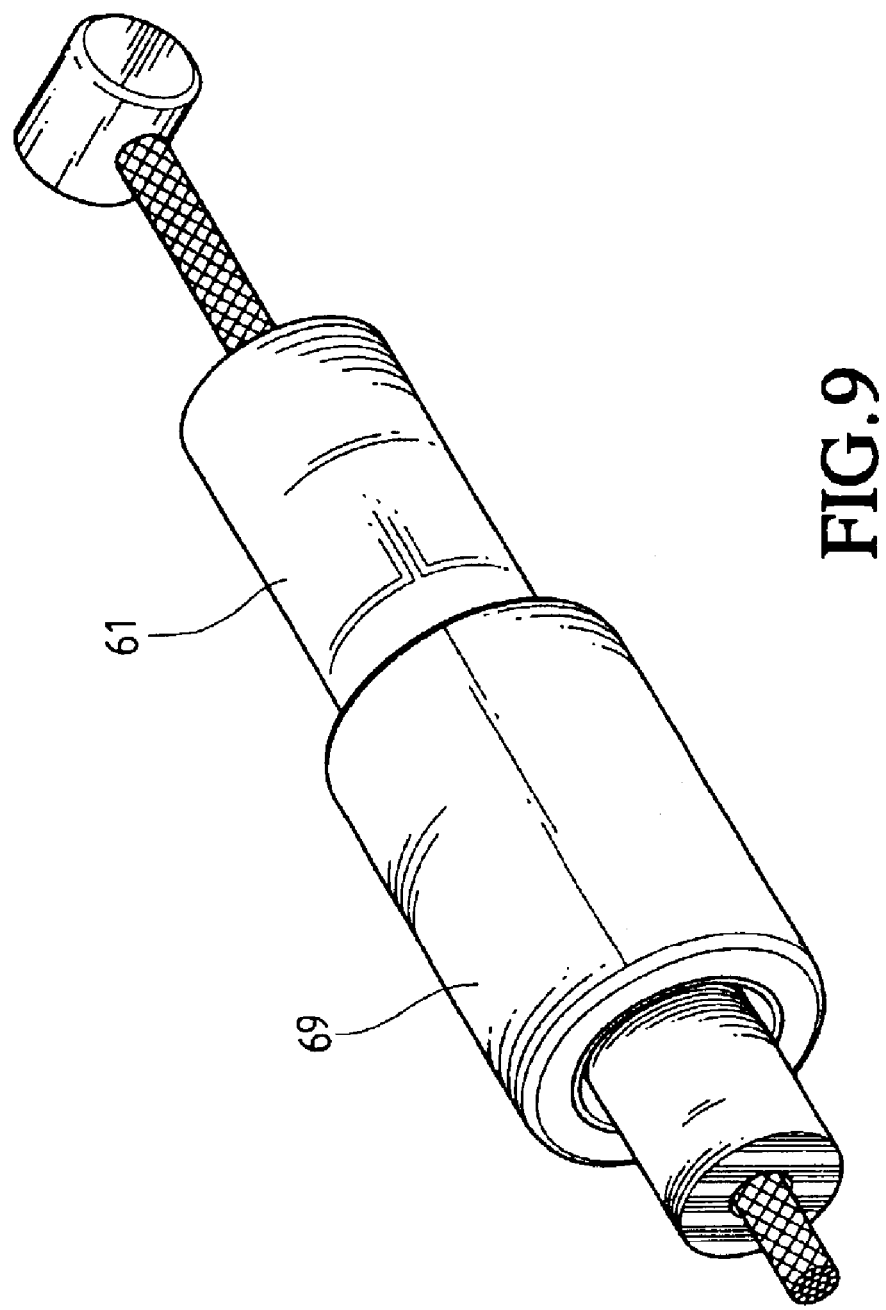
FIG. 9 is a perspective view to show another embodiment of the self-lubrication cable assembly of the present invention.
Figure 10:
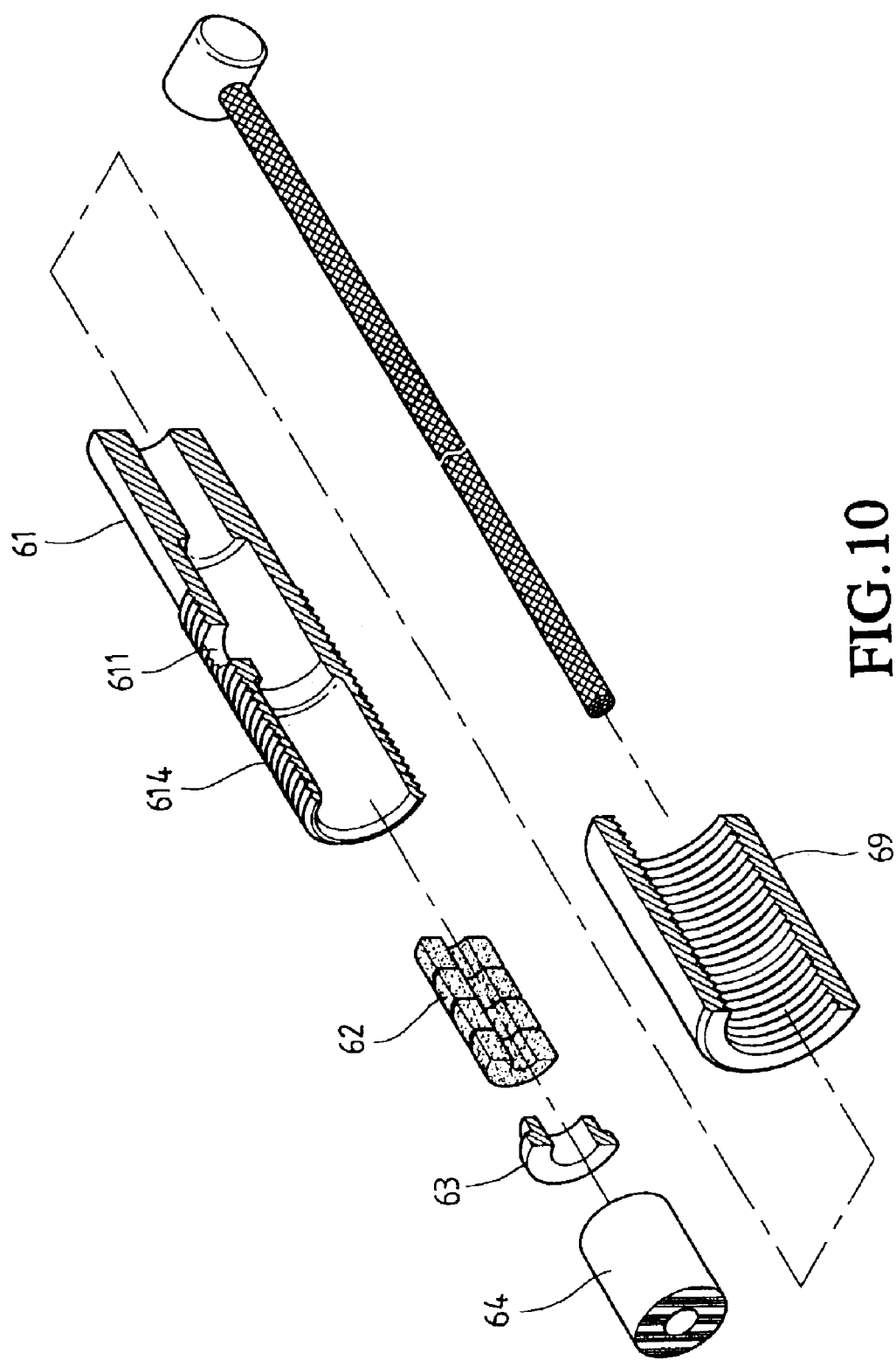
FIG. 10 is an exploded view to show the self-lubrication cable assembly of the present invention as shown in FIG. 9.
Figure 11:
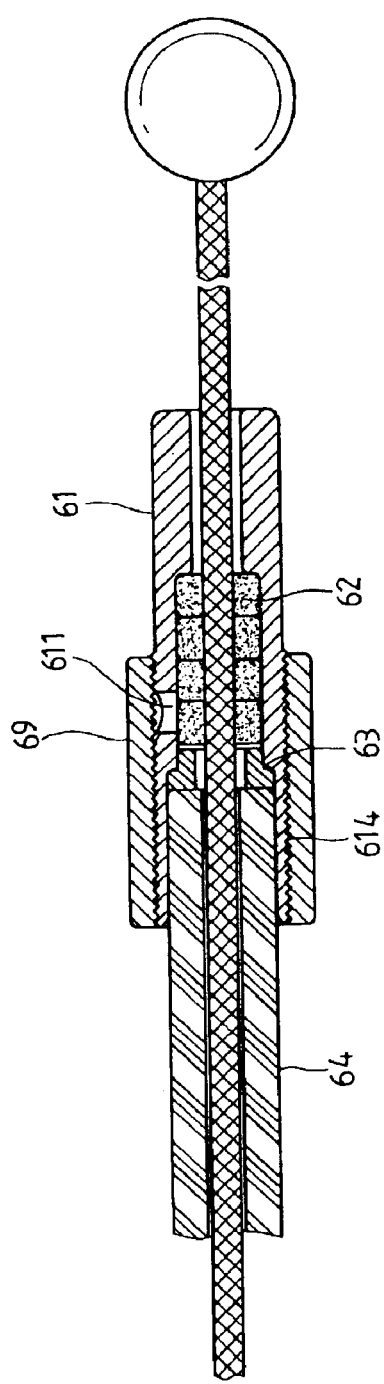
FIG. 11 is a cross sectional view to show the self-lubrication cable assembly of the present invention as shown in FIG. 9.
Figure 12:
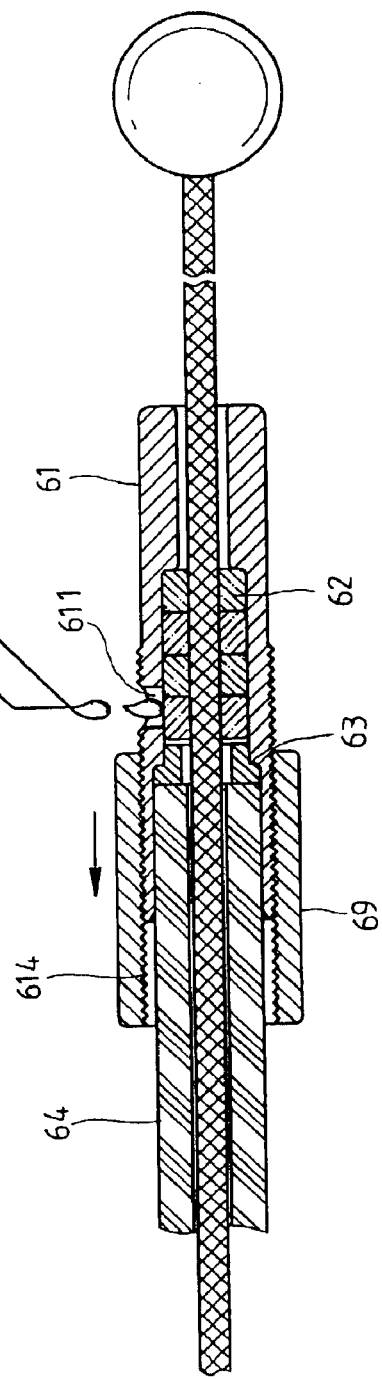
FIG. 12 shows the protection sleeve is pulled and lubricant is provided via the hole in the end cap of the self-lubrication cable assembly of the present invention.

FIGS. 9 to 11 shows another embodiment of the self-lubrication cable assembly of the present invention, wherein the end cap 61 has a threaded section 614 defined in an outer periphery thereof and the protection sleeve 69 is threadedly engaged with the threaded section 614. The protection sleeve 69 can be unscrewed in one direction so as to expose the hole 611.

While we have shown and described the embodiment in accordance with the present invention, it should be clear to those skilled in the art that further embodiments may be made without departing from the scope of the present invention.

What is claimed is:

1. A self-lubrication cable assembly, comprising:

a cable with a sheath mounted thereto;

an end cap connected to an end of the sheath and having a passage defined therethrough, the cable extending through the passage, a chamber defined in the end in the cap and sharing a common axis with the passage, a plurality of lubrication rings received in the chamber and mounted to the cable, a hole defined radially through a wall of the end cap and communicating with the chamber, and a protection sleeve movably mounted to the end in the cap and covering the hole, wherein a first shoulder extends outward from an outer periphery of the end cap and a spring is mounted to the end cap, one end of the spring contacting the first shoulder, the protection sleeve having a second shoulder extending from an inner periphery thereof and the other end of the spring contacting the second shoulder.

2. The assembly as claimed in claim 1, wherein the end cap has a threaded section defined in an outer periphery thereof and the protection sleeve is threadedly engaged with the threaded section.

\* \* \* \* \*